Patent Number: 6,133,466
Date of Patent: Oct. 17, 2000

United States Patent [19]
Edelmann et al.

[54] ACRYLOXYPROPYL- OR METHACRYLOXYPROPYL-FUNCTIONAL SILOXANE OLIGOMERS

[75] Inventors: Roland Edelmann, Wehr; Albert-Johannes Frings, Rheinfelden; Michael Horn, Rheinfelden; Peter Jenkner, Rheinfelden; Ralf Laven, Schwoerstadt; Helmut Mack; Jaroslaw Monkiewicz, both of Rheinfelden; Wolfgang-Wilhelm Orlia, Toenisvorst; Burkhard Standke, Loerrach, all of Germany

[73] Assignee: Degussa-Huels Aktiengesellschaft, Frankfurt am Main, Germany

[21] Appl. No.: 09/366,325

[22] Filed: Aug. 2, 1999

[30] Foreign Application Priority Data

Aug. 3, 1998 [DE] Germany .................. 198 34 990

[51] Int. Cl.[7] .................. C07F 7/08; C07F 7/18
[52] U.S. Cl. ............... 556/440; 106/436; 106/445; 106/446; 106/469; 106/481; 427/387; 427/407.1; 427/407.2; 523/212
[58] Field of Search .................. 556/440; 106/436, 106/465, 469, 466, 481; 427/387, 407.1, 407.2; 523/212

[56] References Cited

U.S. PATENT DOCUMENTS 5,153,332 10/1992 Enami et al. .................. 556/440 X
5,256,754 10/1993 Takarada et al. .................. 556/440
5,369,206 11/1994 Kamei et al. .................. 55/440 X
5,593,787 1/1997 Dauth et al. .................. 556/440 X

*Primary Examiner*—Paul F. Shaver
*Attorney, Agent, or Firm*—Oblon, Spivak, McClelland, Maier & Neustadt, P.C.

[57] ABSTRACT

Mixtures of catenate and cyclic siloxane oligomers of formula I and II

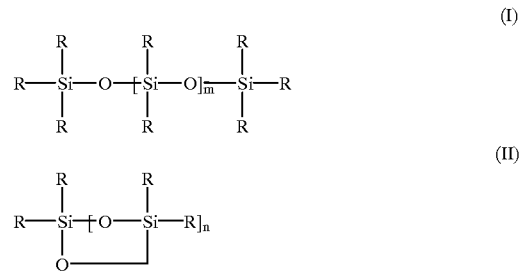

wherein the substituents R consist of 3-methacryloxypropyl or 3-acryloxypropyl groups and methoxy, ethoxy and/or propoxy groups alone or together with $C_1$–$C_{18}$ alkyl, fluoroalkyl, isoalkyl or cycloalkyl groups and/or $C_6$–$C_{12}$ aryl groups and where not more than one 3-methacryloxypropyl or 3-acryloxypropyl group is attached to one silicon atom and the degree of oligomerization of compounds of the formula I is within the range 2<m<25 and of compounds of the formula II is within the range 2<n<8 and the quotient of the molar proportion of Si/alkoxy groups is ≧0.5.

23 Claims, No Drawings

ACRYLOXYPROPYL- OR METHACRYLOXYPROPYL-FUNCTIONAL SILOXANE OLIGOMERS

BACKGROUND OF THE INVENTION

1. Field of the Invention

The present invention relates to mixtures of catenate and cyclic siloxane oligomers of formula I and II

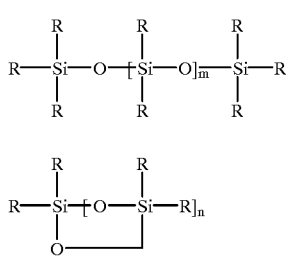

where substituents R consist of both alkoxy groups and unsaturated organofunctional groups alone or together with different organofunctional groups and where not more than one unsaturated organofunctional group is attached to one silicon atom. The present invention also relates to a process for preparing mixtures of catenate and cyclic siloxane oligomers and to their use.

2. Discussion of the Background

Mixtures of catenate and cyclic siloxane oligomers are obtained, for example, by controlled hydrolysis or condensation of organofunctional alkoxysilanes. A particular problem when preparing multifunctional siloxane oligomers is the highly differing hydrolysis or condensation behavior of the individual organoalkoxy- or organochlorosilanes.

EP 0 760 372 discloses water-containing solutions of OH— and acrylic functional organosilanes and organosiloxanes. In these organosiloxanes, hydrolysis is virtually complete.

EP 0 518 057 and DE 196 24 032 disclose mixtures of catenate and/or cyclic vinyl- and also alkyl-functional siloxane oligomers which also carry alkoxy groups. Such mixtures are employed, for example to hydrophobicize mineral surfaces and pulverulent materials, and as cross linking agents for thermoplastic polyolefins.

SUMMARY OF THE INVENTION

Accordingly, one object of the present invention is to provide mixtures of siloxane oligomers which consist of both alkoxy groups and unsaturated organofunctional groups alone or together with the presence of other organofunctional groups in the oligomers.

Another object of the present invention is to provide mixtures of siloxane oligomers which can be employed as binders in paints and varnishes.

Briefly, these objects and other objects of the present invention as hereinafter will become more readily apparent can be attained by a mixture of catenate and cyclic siloxane oligomers of formula I and II

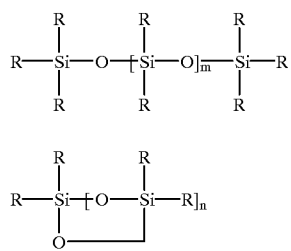

wherein substituents R consist of 3-methacryloxypropyl or 3-acryloxypropyl groups and methoxy, ethoxy and/or propoxy groups alone or together with $C_1$–$C_{18}$ alkyl, fluoroalkyl, isoalkyl or cycloalkyl groups and/or $C_6$–$C_{12}$ aryl groups and where not more than one 3-methacryloxypropyl or 3-acryloxypropyl group is attached to one silicon atom in the molecule and the degree of oligomerization of compounds of the formula I is within the range 2<m<25 and that of compounds of the formula II is within the range $2 \leq n \leq 8$ and the quotient of the molar proportion of Si/alkoxy groups is $\geq 0.5$ which is prepared by a controlled reaction employing a 3-methacryloxypropyltrialkoxysilane or a 3-acryloxypropyltrnalkoxysilane or a 3-methacryloxypropylmethyldialkoxysilane or a 3-acryloxypropylmethyldialkoxysilane as component A and, optionally, a $C_1$–$C_{18}$ alkyl-, fluoroalkyl-, isoalkyl- or cycloalkyl-trialkoxy-silane or phenyl-trialkoxysilane or a $C_1$–$C_{18}$ alkyl-, fluoroalkyl-, isoalkyl- or cycloalkyl-methyldialkoxysilane or phenyl-methyldialkoxysilane, or a mixture of the alkoxysilanes, as component B, and, optionally, a tetraalkoxysilane as component C.

DETAILED DESCRIPTION OF THE PREFERRED EMBODIMENTS

The mixtures of catenate and cyclic siloxane oligomers of the present invention are prepared by adding from 0.6–1.0 mol. of water per mol. of Si and from 0.1–5 times the amount by weight of methanol and/or ethanol to the starting alkoxysilane reactant in the presence of an organic or inorganic acid as catalyst, which is preferably added to the reaction mixture simultaneously with the added water or subsequently, subjecting the resulting mixture to controlled hydrolysis and condensation at a temperature of from 10–95° C. and, subsequently, working up the product mixture by distillation under reduced pressure and at a liquid-phase temperature of from 30–110° C., preferably from 60–110° C. In the course of distillation the catalyst, the free alcohol and residual unhydrolyzed monomeric starting materials are removed almost quantitatively from the product. Suitable examples of the catalyst employed include acetic acid and formic acid, preferably, hydrogen chloride (HCl).

The mixtures resulting from the process of the invention comprise catenate and cyclic siloxane oligomers which are normally homogeneous, clear, colorless to pale yellow liquids of low viscosity which are stable on storage and preferably have a flash point >100° C.

By means of the procedure described above it is possible advantageously to produce siloxane oligomers of the invention possessing, preferably, a statistical distribution of [—Si(R)(R)O—] units of different functionality.

Mixtures of catenate and cyclic siloxane oligomers of the invention can be employed to good advantage, in particular, in paints and varnishes, as binders, and to modify binder systems.

It is also preferred that the boiling point of the mixtures of catenate and cyclic siloxane oligomers of the invention is generally >200° C.

The present invention, therefore, provides a mixture of catenate and cyclic siloxane oligomers of the formula I and II

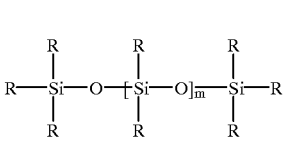

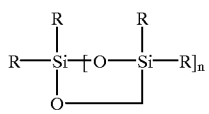

(II)

wherein the substituents R consist of 3-methacryloxypropyl or 3-acryloxypropyl groups and methoxy, ethoxy and/or propoxy groups alone or together with $C_1$–$C_{18}$ alkyl fluoroalkyl, isoalkyl or cycloalkyl groups and/or $C_6$–$C_{12}$ aryl groups and where not more than one 3-methacryloxypropyl or 3-acryloxypropyl group is attached to one silicon atom in the molecule and the degree of oligomerization of compounds of the formula I is within the range $2<m<25$ and that of compounds of the formula II is within the range $2 \leq n \leq 8$ and the quotient of the molar proportion of Si/alkoxy groups is $\geq 0.5$.

Mixtures of catenate and cyclic siloxane oligomers of the invention preferably have an alkoxy group content of more than 0.1% by weight and less than 30% by weight, particularly from 5–25% by weight, based on the weight of the siloxane oligomers present.

In a preferred oligomer mixture of the invention, preferably, substituents R consist of (i) methacryloxypropyl groups and (ii) methoxy or ethoxy groups. In order to prepare such mixtures it is appropriate to employ 3-methacryloxypropyltrimethoxysilane or 3-methacryloxypropyltriethoxysilane. Alternatively, the oligomer mixture can be prepared by reacting a mixture of 3-methacryloxypropyltrimethoxysilane and tetramethoxysilane.

In a mixture according to the invention it is likewise preferable for the substituents R to consist of (i) 3-methacryloxypropyl groups and (ii) methoxy or ethoxy groups and (iii) methyl, propyl, isobutyl, oclyl, hexadecyl or phenyl groups. Such mixtures can be prepared starting from a mixture of 3-methacryloxypropyltrimethoxysilane and n-propyltrimethoxysilane or from a mixture of 3-methacryloxypropyltrimethoxysilane and octyltrimethoxysilane or from a mixture of 3-methacryloxypropyltrimethoxysilane, octyltrimethoxysilane and tetramethoxysilane or from a mixture of 3-methacryloxypropyltrimethoxysilane and n-propyltrimethoxysilane or from a mixture of 3-methacryloxypropyltrimethoxysilane and isobutyltrimethoxysilane or from a mixture of 3-methacryloxypropyltrimethoxysilane and tridecafluoro-1,1,2,2-tetrahydrooctyl-1-trimethoxysilane or from a mixture of 3-methacryloxy-propyltrimethoxysilane and phenyltrimethoxysilane, to give but a few examples.

The substituents R of preferred mixtures of catenate and cyclic siloxane oligomers of the invention can also consist of (i) 3-methacryloxypropyl groups and (ii) methoxy or ethoxy groups and (iii) methyl groups and (iv) propyl, isobutyl, octyl, hexedecyl or phenyl groups. Such mixtures can be prepared starting, for example, from 3-methacryloxypropyltrimethoxysilane and n-propylmethyldimethoxysilane or from 3-methacryloxypropylmethyldimethoxysilane and octyltrimethoxysilane or from 3-methacryloxypropylmethyldimethoxysilane and n-propylmethyldiethoxysilane or from 3-methacryloxypropyltrimethoxysilane, n-propyltrimethoxysilane and methyltrimethoxysilane or from 3-methacryloxypropylmethyldimethoxysilane, octyltrimethoxysilane and tetramethoxysilane or from 3-methacryloxypropylmethyldimethoxysilane, n-propylmethyidiethoxysilane and tetramethoxysilane.

Mixtures of catenate and cyclic siloxane oligomers of the invention preferably have a viscosity of from 3–80 mPa·s, with particular preference from 4–40 mPa·s.

Suitable examples of catenate and cyclic siloxane oligomers include: 3-methacryloxypropyl-/alkoxy-siloxanes, 3-methacryloxypropyl-/methyl-/ alkoxy-siloxanes, 3-methacryloxy-/propyl-/alkoxy-siloxanes, 3-methacryloxypropyl-/isobutyl-/alkoxy-siloxanes, 3-methacryloxypropyl-/octyl-/alkoxy-siloxanes, 3-methacryloxypropyl-/hexadecyl-/alkoxy-siloxanes, 3-methacryloxypropyl-/phenyl-/alkoxy-siloxanes, 3-methacryloxypropyl-/heptafluorohexyl-/alkoxy-siloxanes, 3-methacryloxy-propyl-/methyl-/phenyl-/alkoxy-siloxanes, 3-methacryloxypropyl/methyl-/octyl-/alkoxy-siloxanes, 3-methacryloxypropyl-/methyl-/propyl/alkoxy-siloxane, 3-methacryloxypropyl-/methyl-/octyl-/alkoxy-siloxane, 3-methacryloxypropyl-/methyl-/heptafluorohexyl-/alkoxy-siloxanes, 3-methacryloxypropyl-/propyl-/heptafluorohexyl-/alkoxy-siloxanes, 3-methacryloxypropyl-/octyl-/heptafluorohexyl-/alkoxy-siloxanes, the alkoxy groups preferably being methoxy or ethoxy groups although it is also possible for ethoxy and methoxy groups to be present alongside one another.

An aspect of the invention is the provision of a process for preparing a mixture of catenate and cyclic siloxane oligomers of the invention by controlled hydrolysis by which a 3-methacryloxypropyltrialkoxysilane or a-3-acryloxypropyltrialkoxysilane or a 3-methacryloxypropylmethyldialkoxysilane or a 3-acryloxypropylmethyldialkoxysilane, as component A, is reacted with, if desired, a $C_1$–$C_{18}$-alkyl-, fluoroalkyl-, isoalkyl- or cycloalkyl-trialkoxysilane or phenyltnalkoxysilane or a $C_1$–$C_{18}$-alkyl-, fluoroalkyl-, isoalkyl- or cycloalkyl-methyldialkoxysilane or phenyl-methyldialkoxysilane, or a mixture of said alkoxysilanes, as component B, and, if desired, a tetraalkoxysilane, as component C. From 0.6–1.0 mol. of water per mol. of Si and from 0.1–5 times the amount by weight of methanol and/or ethanol, based on the alkoxysilanes employed, is added to the alkoxysilane reactant(s). An acid catalyst is employed, preferably HCl, and the resulting mixture is subjected to controlled hydrolysis and condensation at a temperature of from 10–95° C. Subsequently, the product mixture is worked-up by distillation under reduced pressure and at a liquid-phase temperature of from 30–110° C.

In general, the process of the invention is performed as follows: Component A, optionally component B and optionally component C is (are) introduced as an initial charge into a reaction vessel. A solvent or diluent, such as methanol or ethanol, may be added to the alkoxysilane mixture. It is also acceptable to add the calculated amount of water for the reaction. The catalyst can be introduced with the added water or subsequently, appropriately with thorough mixing by means, for example, of stirring. Prior to or after the addition of water and/or catalyst, the reaction mixture can be heated and, after the reaction, the resultant product mixture can be worked-up by distillation.

In the process of the invention components A, B and C are employed preferably in a molar ratio A:B:C of from 1:0:0–1:10:0, more preferably from 1:0:0–1:4:0, or from 1:0:0–1:0:10, more preferably from 1:0:0–1:0:4, or from 1:0:0–1:10:10, more preferably from 1:0:0–1:4:4. It is particularly preferred to employ alkyl- or phenyl-alkoxysilanes or mixtures of alkyl- and fluoroalkyl-alkoxysilanes or mixtures of alkyl- and phenylalkoxysilanes as component B. For this purpose it is possible to employ fluoroalkyl-functional alkoxysilanes with mono-, oligo- or perfluorinated alkyl groups, especially those of 1–9 carbon atoms.

In the process of the invention it is also preferred to employ alkoxysilanes having methoxy or ethoxy groups which correspond to the alcohol that is used as solvent or diluent. The solvent or diluent employed is suitably methanol, ethanol or a mixture of methanol and ethanol. However, other alcohols or alcohol mixtures can also be used.

In the process of the invention the hydrolysis and condensation of the alkoxysilanes employed are conducted preferably under atmospheric pressure at a temperature from 10–85° C., preferably from 20–50° C. The reaction is normally conducted under atmospheric pressure, although it may also be conducted under reduced pressure or at superatmospheric pressure. It is appropriate to allow the reaction mixture to react for 0.5–3 hours before beginning the work-up by distillation of the product mixture.

Following work-up by distillation, the product of the invention contains less than 0.5% by weight of components A, B and C. As to free alcohol, the product contains less than 2% by weight, preferably less than 1% by weight, of the alcohols.

Mixtures of catenate and cyclic siloxane oligomers of the invention can advantageously be used in the ways described below, which, however, represent only non-limiting examples.

The mixture of catenate and cyclic siloxane oligomers of the present invention may be used as additives in casting resins that are based on flowable, curable methacrylates and are filled to a high level with finely divided inorganic fillers. Through such use it is possible advantageously to achieve a marked reduction in the viscosity of the casting resin in comparison with similar casting resins to which the oligomeric product has not been added.

The present invention, therefore, also provides for the use of a mixture of catenate and cyclic siloxane oligomers of the invention to modify and crosslink( organic resins.

The present mixture of catenate and cyclic siloxane oligomers of the invention also enable the manufacture of plastic articles and moldings of improved mechanical strength and optical properties.

The mixture of catenate and cyclic siloxane oligomers of the invention may also be used to treat and modify the surface of glass fibers, especially for enhanced adhesion in glass fiber-reinforced plastics.

The mixture of catenate and cyclic siloxane oligomers of the invention is also employable as a cobinder in coating materials and as a component in transparent coating materials. By the use of mixtures of catenate and cyclic siloxane oligomers of the invention it is possible to achieve a distinct improvement in performance properties such as, in particular, weathering stability, scratch resistance and chemical resistance.

The mixture of catenate and cyclic siloxane oligomers of the invention may be used to produce coatings which are cured conventionally by heat treatment at a temperature from 40–200° C., preferably from 80–150° C., and/or by treatment with radiation, for example by UV or microwave radiation.

The mixture of catenate and cyclic siloxane oligomers of the invention may also be employed to treat or coat mineral or metallic surfaces. By means of such a treatment it is possible to advantageously modify the surface properties of the treated surface. For instance, mixtures of the invention can be employed in particular as hydrophobicizing agents and/or adhesion promoters for materials such as fillers and pigments, especially formica, aluminum, brass, copper pigments, pearl luster pigments, and the like.

The mixture of catenate and cyclic siloxane oligomers of the invention may also be used to silanize pulverulent substances, including preferably $TiO_2$, kaolin, aluminum hydroxide, $CaCO_3$, talc, quartz flours and cristobalite flours.

Having generally described this invention, a further understanding can be obtained by reference to certain specific examples which are provided herein for purposes of illustration only and are not intended to be limiting unless otherwise specified.

EXAMPLES

Example 1

A 992 g amount of 3-methacryloxypropyltrimethoxysilane is introduced as an initial charge into a 2 liter glass stirred reactor under reduced-pressure, and then 57.6 g of water mixed beforehand with 0.2 g of 37% by weight aqueous HCl, are metered into the stirred reactor together with 256 g of methanol at room temperature and under atmospheric pressure. The mixture is heated to boiling and refluxed gently for 1 hour. Subsequently, the major proportion of the methanol and of the HCl is removed by distillation under atmospheric pressure over the course of 2 hours. Subsequently, a reduced pressure is applied, starting from 900 mbar and failing to about 1 mbar, a liquid-phase temperature of below 80° C. is established, and in this manner residual methanol, HCl and starting materials are removed, and the liquid-phase product is held under these conditions for 2 hours, to give 840 g of siloxane oligomer having the following characteristics:

| | |
|---|---|
| Free methanol (by GC): | 0.3% by weight |
| Viscosity: | 35 mPa s (DIN 53 015) |
| Boiling point: | 257° C. (ASTM D-1120) |
| Flashpoint: | 152° C. (DIN 51 755) |
| Density: | 1.117 g/ml (DIN 51 757) |
| Cl content: | 100 mg/kg |
| Average molecular weight: | 650 g/mol. (by gel permeation chromatography) |

Example 2

A 744 g of 3-methacryloxypropyltrimethoxysilane and 492.9 g of propyltrimethoxysilane are introduced as an initial charge into a 2 liter glass stirred reactor with reduced-pressure, and then 86.4 g of water, mixed beforehand with 0.3 g of 37% by weight aqueous HCl, are metered in together with 192 g of methanol at room temperature and under atmospheric pressure. The mixture is heated to boiling and refluxed gently for 1 hour. Subsequently, the major proportion of the methanol and of the HCl is removed by distillation under atmospheric pressure over the course of 3 hours. Subsequently, a reduced pressure is applied, starting from 900 mbar and falling to about 1 mbar, a liquid-phase temperature of below 95° C. is established, and in this manner residual methanol, HCl and starting materials are removed, and the liquid-phase product is held under these conditions for 2 hours, to give 1020 g of siloxane oligomer having the following characteristics:

| | |
|---|---|
| Free methanol (by GC): | 0.6% by weight |
| Viscosity: | 14.3 mPa s (DIN 53 015) |
| Boiling point: | 277° C. (ASTM D-1120) |
| Flash point: | 110° C. (DIN 51 755) |
| Density: | 1.083 g/ml (DIN 51 757) |
| Cl content: | 200 mg/kg |
| Average molecular weight: | 570 g/mol. (by gel permeation chromatography) |

The disclosure of German priority application No. 19834990.4 filed Aug. 3, 1998 is hereby incorporated by reference into the present application.

Obviously, numerous modifications and variations of the present invention arc possible in light of the above teachings. It is, therefore, to be understood that within the scope of the appended claims, the invention may be practiced otherwise than as specifically described herein.

What is claimed as new and is desired to be secured by Letters Patent:

1. A mixture of catenate and cyclic siloxane oligomers of the formula I and II

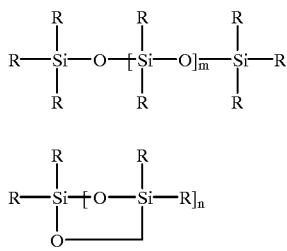

wherein the substituents R consist of 3-methacryloxypropyl or 3-acryloxypropyl groups and methoxy, ethoxy and/or propoxy groups alone or together with $C_1$–$C_{18}$ alkyl, fluoroalkyl, isoalkyl or cycloalkyl groups and/or $C_6$–$C_{12}$ aryl groups and where not more than one 3-methacryloxypropyl or 3-acryloxypropyl group is attached to one silicon atom and the degree of oligomerization of compounds of the formula I is within the range $2<m<25$ and of compounds of the formula II is within the range $2 \leq n \leq 8$ and the quotient of the molar proportion of Si/alkoxy groups is $\geq 0.5$.

2. The mixture as claimed in claim 1, which has an alkoxy group content of more than 0.1% by weight and less than 30% by weight, based on the weight of the siloxane oligomers present.

3. The mixture as claimed in claim 1, wherein substituents R consist of (i) 3-methacryloxypropyl groups and (ii) methoxy or ethoxy groups.

4. The mixture as claimed in claim 1, wherein substituents R consist of (i) 3-methacryloxypropyl groups and (ii) methoxy or ethoxy groups and (iii) methyl, propyl, isobutyl, octyl, hexadecyl or phenyl groups.

5. The mixture as claimed in claim 1, wherein substituents R consist of (i) 3-methacryloxypropyl groups and (ii) methoxy or ethoxy groups and (iii) methyl groups and (iv) propyl, isobutyl octyl, hexadecyl or phenyl groups.

6. The mixture as claimed in claim 1, which has a viscosity of from 3–80 mPas.

7. The mixture as claimed in claim 1, which has a flash point >100° C.

8. The mixture as claimed in claim 1, which has a boiling point >200° C.

9. A process for preparing a mixture of catenate and cyclic siloxane oligomers as claimed in claim 1, comprising:

hydrolyzing and condensing a 3-methacryloxypropyltrialkoxysilane or a 3-acryloxypropyltrialkoxysilane or a 3-methacryloxypropylmethyidialkoxysilane or a 3-acryloxypropylmethyldialkoxysilane, as component A, in a controlled manner, and optionally a $C_1$–$C_{18}$ alkyl-, fluoroalkyl-, isoalkyl- or cycloalkyl-trialkoxysilane or phenyl-trialkoxysilane or a $C_1$–$C_{18}$ alkyl-, fluoroalkyl-, isoalkyl- or cycloalkyl-methyldialkoxysilane or phenyl-methyidialkoxysilane, or a mixture thereof, as component B, and, optionally a tetrealkoxysilane, as component C with from 0.6–1.0 mol. of water per mol. of Si and from 0.1–5 times the amount by weight of methanol and/or ethanol, based on the alkoxysilanes employed, in the presence of an acid catalyst at a temperature of from 10–95° C.; and subsequently working-up the product mixture by distillation under reduced pressure and at a liquid-phase temperature of 30–110° C.

10. The process as claimed in claim 9, wherein components A, B and C are employed in a molar ratio A:B:C of from 1:0:0–1:10:0 or from 1:0:0–1:0:10 or from 1:0:0–1:10:10.

11. The process as claimed in claim 9, wherein alkoxysilanes have methoxy or ethoxy groups in correspondence with the hydrocarbyl radical of the alcohol used as solvent or diluent.

12. The process as claimed in claim 9, wherein hydrogen chloride is the acid catalyst.

13. The process as claimed in claim 9, wherein the hydrolysis and condensation are conducted under atmospheric pressure at a temperature from 10–85° C.

14. The process as claimed in claim 9, wherein the product following distillation contain less than 0.5% by weight of components A, B and C and less than 2% by weight of free alcohol.

15. A method of manufacture, comprising:

incorporating the catenate and cyclic siloxane oligomers as claimed in claim 1 in a casting resin which is based on flowable, curable methacrylates filled with a substantial amount of finely divided inorganic filler.

16. A method, comprising:

incorporating the mixture of catenate and cyclic siloxane oligomers as claimed in claim 1 into plastic articles and moldings, thereby improving the mechanical strength and optical properties of said plastic articles and moldings.

17. A method, comprising:

coating the surfaces of glass fibers with the catenate and cyclic siloxane oligomers as claimed in claim 1 to surface-treat the glass fibers.

18. A method, comprising:

modifying and cross-linking organic resins by incorporating the mixture of catenate and cyclic siloxane oligomers as claimed in claim 1 in an organic resin.

19. A method of manufacture, comprising:

incorporating the mixture of catenate and cyclic siloxane oligomers as claimed in claim 1 as a binder in coating materials.

20. The method of claim 19, wherein coating material is a transparent coating material.

21. A method, comprising:

coating a substrate with a resin composition containing the mixture of catenate and cyclic siloxane oligomers as claimed in claim 1 thereby producing coatings which are cured conventionally by heat treatment at a temperature from 40–200° C. and/or by treatment with radiation.

22. A method, comprising:

treating or coating mineral or metallic surfaces with the mixture of catenate and cyclic siloxane oligomers as claimed in claim 1.

23. A method, comprising:

surface treating pulverulent substances with the mixture of catenate and cyclic siloxane oligomers as claimed in claim 1.

* * * * *